(12) United States Patent
Fehrer et al.

(10) Patent No.: US 7,600,926 B2
(45) Date of Patent: Oct. 13, 2009

(54) DEVICE FOR ADJUSTING AN OPTICAL FIBER OR AN OPTICAL FIBER BUNDLE

(75) Inventors: Dirk-Oliver Fehrer, Bad Schönborn (DE); Holger Birk, Meckesheim (DE)

(73) Assignee: Leica Microsystems CMS GmbH, Wetzlar (DE)

( * ) Notice: Subject to any disclaimer, the term of this patent is extended or adjusted under 35 U.S.C. 154(b) by 190 days.

(21) Appl. No.: 11/718,304

(22) PCT Filed: Sep. 12, 2005

(86) PCT No.: PCT/DE2005/001592

§ 371 (c)(1),
(2), (4) Date: Apr. 30, 2007

(87) PCT Pub. No.: WO2006/045264

PCT Pub. Date: May 4, 2006

(65) Prior Publication Data

US 2009/0022471 A1 Jan. 22, 2009

(30) Foreign Application Priority Data

Oct. 29, 2004 (DE) .................. 10 2004 052 953

(51) Int. Cl.
*G02B 6/42* (2006.01)
(52) U.S. Cl. ...................................... 385/90; 385/137

(58) Field of Classification Search ................... 385/90, 385/137
See application file for complete search history.

(56) References Cited

U.S. PATENT DOCUMENTS

| | | |
|---|---|---|
| 6,276,843 B1 | 8/2001 | Alcock et al. |
| 6,498,892 B1 | 12/2002 | Harman |
| 2004/0114873 A1* | 6/2004 | Alexeev et al. ............... 385/52 |

FOREIGN PATENT DOCUMENTS

| | | |
|---|---|---|
| DE | 36 08 236 A1 | 9/1987 |
| EP | 0 937 961 A2 | 8/1999 |
| GB | 2 131 908 A | 6/1984 |

* cited by examiner

*Primary Examiner*—Jerry T Rahll
(74) *Attorney, Agent, or Firm*—Foley & Lardner LLP

(57) ABSTRACT

Disclosed is a device for adjusting an optical fiber (1) or an optical fiber bundle relative to a coupling point. Said device comprises a holding apparatus (2) for the fiber/s (1) and a mechanism (3) for positioning the fiber/s (1) in said holding apparatus (2). The positioning mechanism (3) is provided with at least two positioning members (4) which act upon the fiber/s (1) at different angles, the position of the fiber/s (1) relative to the holding apparatus (2) being modifiable by actuating said at least two positioning members (4). The inventive device is characterized in that the positioning members (4) which are effective at different angles are disposed next to each other in the holding apparatus (2) in order to be actuated from one side while at least one of the positioning members (4) acts upon the fiber/s (1) via a lever assembly (5).

21 Claims, 2 Drawing Sheets

Figure 1:
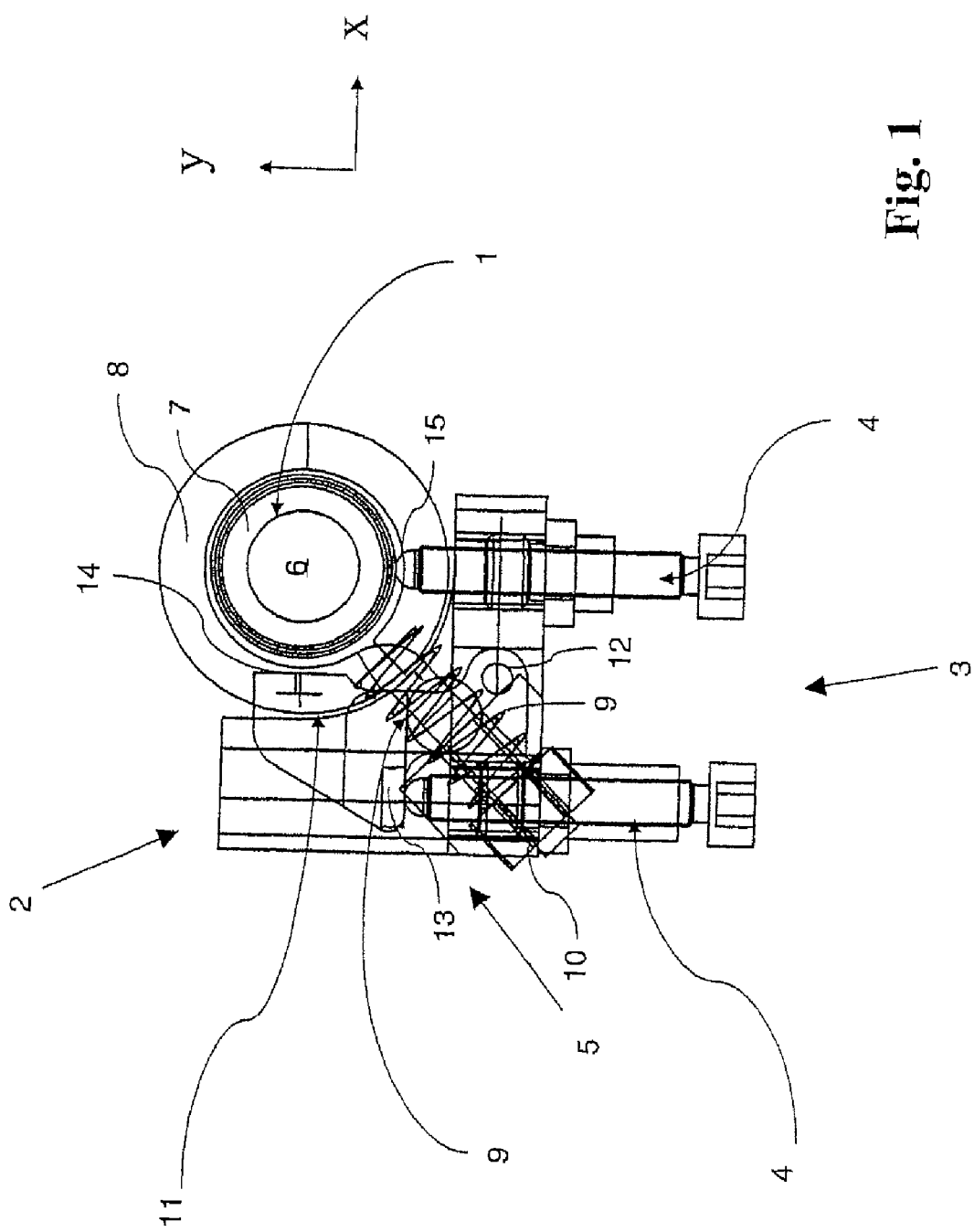

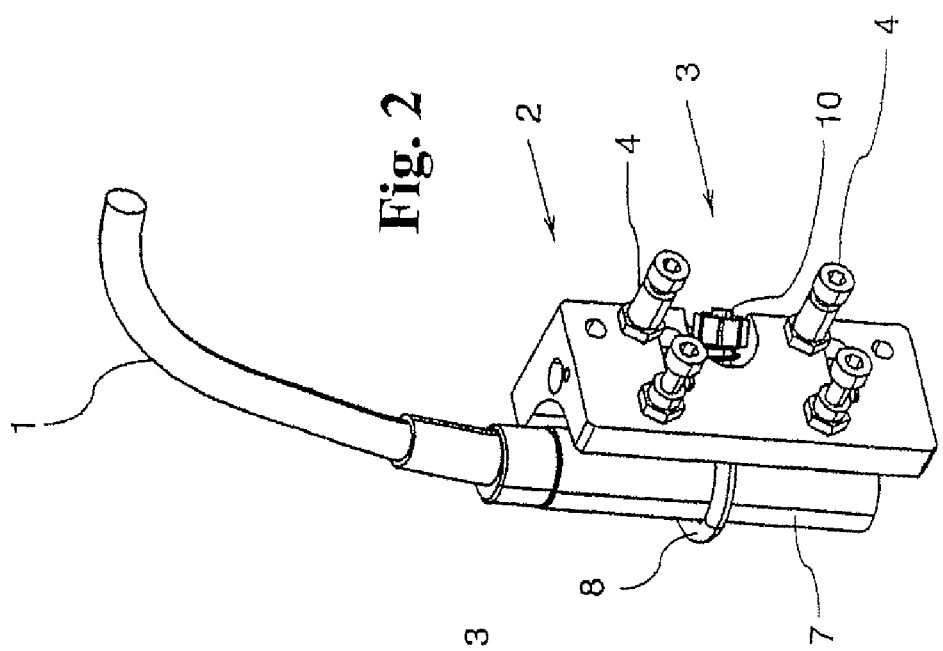
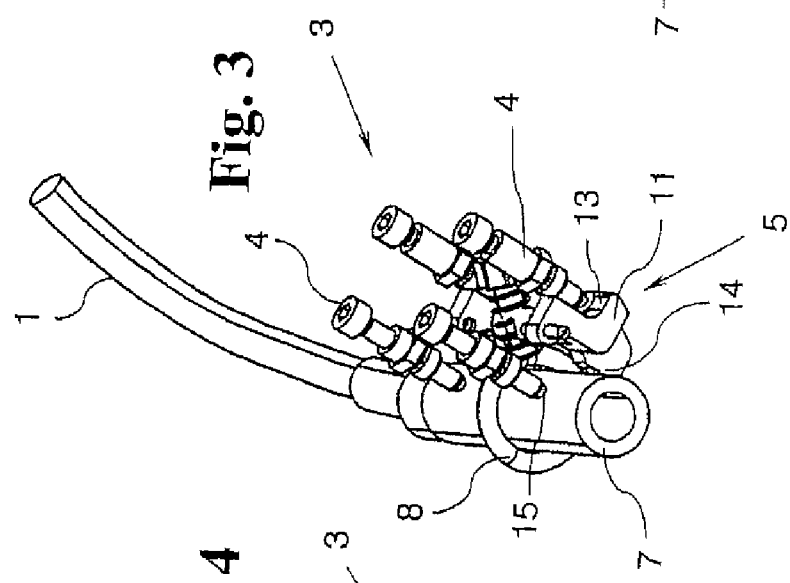
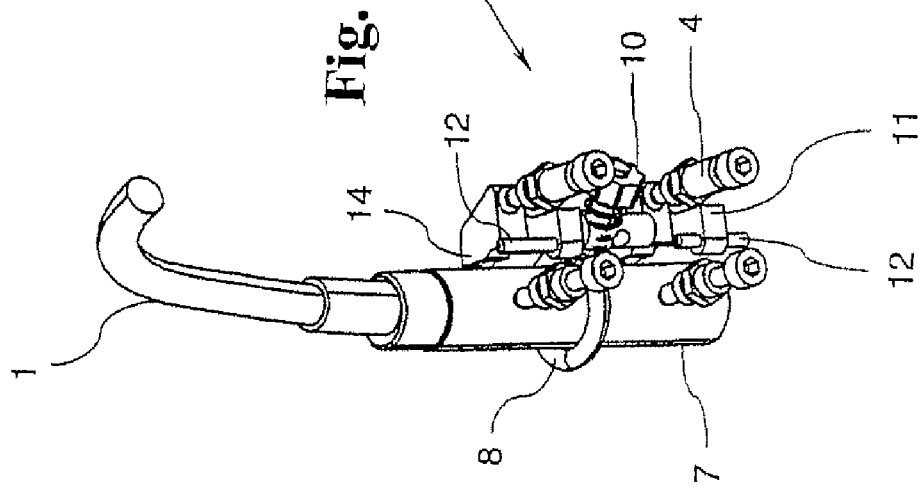

DEVICE FOR ADJUSTING AN OPTICAL FIBER OR AN OPTICAL FIBER BUNDLE

The present invention relates to an apparatus for adjusting an optical fiber or an optical fiber bundle relative to a coupling point, having a holding device for the fiber/fibers and a positioning mechanism for positioning the fiber/fibers in the holding device, the positioning mechanism comprising at least two positioning members that act on the fiber/fibers at different angles and can, by being actuated, vary the position of the fiber/fibers relative to the holding device.

Apparatuses of the generically determinative type are known from practice. Reference is made to U.S. Pat. No. 6,276,843 B1 to this end, purely by way of example. The apparatus shown there for adjusting an optical fiber or an optical fiber bundle comprises a very particular holding device whose positioning mechanism for positioning the fiber/fibers in the holding device has positioning members designed as screws that are screwed at different angles on the circumference of the holding device through the wall of the holding device. Consequently, in the case of the generically determinative apparatus, the adjustment of the optical fiber or of the optical fiber bundle requires the holding device or the positioning members provided there to be actuated from all sides. This requires a very substantial installation and adjustment space, it being necessary in the final analysis to be able to actuate the holding device freely about at least an angular range of 90°, specifically by means of direct access to the positioning members there. However, particularly given increasing miniaturization, it is an impediment, or even an impossibility, to keep such an installation and adjustment space available.

It is therefore the object of the present invention to configure and develop an apparatus for adjusting an optical fiber or an optical fiber bundle relative to a coupling point in such a way that the adjustment is easily possible given a small installation and adjustment space in conjunction with simple construction.

The above object is achieved by means of an apparatus having the features of patent claim 1. Accordingly, the generically determinative apparatus is characterized in that the positioning members acting at different angles are arranged next to one another in the holding device in order to be actuated from one side, and in that at least one of the positioning members acts on the fiber/fibers via a lever arrangement.

It has firstly been realized in a way according to the invention that the positioning members acting at different angles are to be arranged next to one another in the holding device in order to be actuated from one side, and that at least one of the positioning members acts on the fiber/fibers via a lever arrangement.

It may be remarked to this end that the adjustment of an optical fiber or of an optical fiber bundle is being talked of within the context of the teaching according to the invention. Of course, this also includes the adjustment of any sort of components that bear the optical fiber or the optical fiber bundle. Thus, it is to be borne in mind that is regularly required to adjust not the fiber or the fiber bundle directly, but rather a component that contains the optical fiber or the optical fiber bundle in a preassembled way.

Furthermore, it is realized in accordance with the invention that in the case of the generically determinative apparatus there is a problem with the requirement of accessing the apparatus from all sides, but at least with the requirement of accessing in a region of at least 90° relative to the apparatus, and that the installation and adjustment space is unnecessarily large. It has further been realized that it is fundamentally possible for the positioning members acting at different angles to be arranged next to one another in the holding device for the purpose of actuation from one side. It is necessary to this end for at least one of the positioning members to act via a lever arrangement on the fiber/fibers and/or on the component containing the fiber/fibers. In other words, the actuation is concentrated in the way according to the invention in one region, and given the provision of two positioning members, the latter act on the fiber/fibers at different angles. These different acting angles can be achieved by having one of the positioning members act directly, and the other indirectly, on the fiber/fibers, specifically via a lever arrangement such that the actuation is to be accomplished, overall, from one side by positioning members lying next to one another. By comparison with the prior art, the combination of the features named above results in a substantially smaller installation and adjustment space such that miniaturization in the way according to the invention is very substantially favored.

In concrete terms, it is advantageous when the fiber or the fiber bundle is held with a free end that serves for coupling an optical component or subassembly into the coupling point by or in a particular receptacle on which the positioning mechanism acts. Thus, it is fundamentally to be assumed that the fiber (this always also meaning a fiber bundle in the text which follows) is firmly embedded in a receptacle that is of large enough design for a mechanical positioning mechanism to act on the alignment of the fiber for the purpose of adjustment. In concrete terms, the receptacle can be a preferably cylindrical sleeve that can be acted on directly or indirectly via the positioning members.

It is fundamentally conceivable that an adjustment is performed in two degrees of freedom, offset in the x-direction and in the y-direction. Usually, however, the adjustment is performed in four degrees of freedom such that a setting is required by four mutually independent positioning members, specifically offset x/y and angle x/y. It is necessary to this extent that in the case of four positioning members, two of the positioning members act on the fiber or its receptacle at an angle different from the two other positioning members. The lever arrangement is to be designed correspondingly such that the positioning members can be arranged next to one another and can thus be confirmed from one side.

Furthermore, it is conceivable to consider two further degrees of freedom in the adjustment, specifically with reference to a displaceability of the fiber in an axial direction and with reference to a rotation of the fiber or of the fiber bundle. To this end, in addition to the lever arrangement, it would be possible to provide a displacing mechanism that displaces the fiber in a longitudinal direction. This could, for example, be performed via a toothed linkage and spindle screw. The rotation of the fiber or its receptacle/sleeve could be performed via the cooperation of an external thread on the sleeve with an internal thread of a further guide that is arranged in the holding device.

In any event, there is particular importance in four degrees of freedom being able to be set with reference to the offset x/y and angle x/y such that at least four mutually independent positioning members are advantageous. These positioning members act in pairs at different angles on the fiber and/or on the receptacle/sleeve in which the free end of the fiber is arranged.

In a further advantageous way, the positioning members acting at different angles lie substantially in a common plane such that they can be actuated from one side in conjunction with a reduction in the requisite adjustment space. It is of further advantage in the context of such a refinement when the holding device is designed at least in the region of the positioning members as a plate through which the positioning members extend, on the one hand, directly toward the fiber, and on the other hand toward the fiber via the lever arrangement.

According to the above designs, not only the positioning members acting at different angles, but, in a further advantageous way, all the positioning members lie substantially in a common plane such that adjustment space once again is very substantially reduced.

The positioning members are advantageously screws that can be screwed by the holding device, in concrete terms fine thread adjusting screws. These screws are arranged substantially parallel to one another and extend through the holding device in a way screwed in there and capable of being displaced by rotation in their longitudinal alignment.

The holding device by means of which the fiber can be adjusted relative to a coupling point can, for example, be designed as a housing, in which case the fiber/fibers and/or receptacle or sleeve extend through the housing at least partially with play. In the context of a particularly simple refinement of the holding device, it is advantageous when the latter is designed as an angle piece surrounding the fiber/fibers and/or receptacle or sleeve at least partially with play, in which case this angle piece has a sufficiently large longitudinal extent such that it grips the receptacle or sleeve over its length at least partially.

In order to fix the fiber/fibers and/or the receptacle or the sleeve, particular fastening means are provided with the aid of which the fiber/fibers and/or the receptacle or the sleeve are/is held by the holding device. In a structurally simple way, the fastening mean comprise at least one holding ring surrounding the fiber/fibers and/or the receptacle or the sleeve, it being entirely possible to provide two or more holding rings over the longitudinal extent of the holding device. It is to be ensured in this case that the fiber is held flexibly relative to the holding device such that an adjustment in the respective degrees of freedom is possible via the positioning members.

In concrete terms, the fiber or the fibers is/are, or the receptacle or the sleeve is held elastically. It is of further advantage in implementing such an elastic holding when the fiber/fibers and/or the receptacle or the sleeve is pressed against the positioning members and lever arrangement or against the inner wall of the holding ring with the aid of an elastic means, preferably with the aid of a spring, such that the mobility in the respective degrees of freedom in conjunction with overcoming a bias is ensured. In order to implement the setting by the positioning members, in particular with reference to acting on the fiber from different directions, it is advantageous when the lever arrangement has a tilting lever between the fiber or between the fibers or between the receptacle or the sleeve and the holding device. This tilting lever could be integrated at least partially in the inner wall of the holding device. In any event, the tilting lever is pivotably supported on or in the holding device such that the tilting lever can be acted on through the wall of the holding device, or can have its tilting position adjusted.

It may be remarked at this point that both the tilting lever and the positioning members can have precautionary measures promoting actuation at their free ends, that is to say terminally. Thus, it is advantageous to provide rounded actuating domes there by means of which the frictionally induced wear is reduced. It is possible to apply coatings that diminish wear.

As already mentioned previously, the tilting lever is pivotably assigned to the holding device. Through being acted upon by means of a positioning number at an angle defined by the tilting lever, the tilting lever presses against the fiber or against the fibers or against the receptacle or sleeve such that a setting or adjustment is possible in accordance with the respective degree of freedom. In concrete terms, the tilting lever has an engagement region for engaging the actuating member, and an actuating region, angled away therefrom, for pressing against the fiber or against the fibers or against the receptacle or sleeve, the tilting lever preferably forming an acting angle of 90° to the plane of the actuating members. It is thereby possible to operate all four degrees of freedom from one side, specifically in conjunction with as small an adjustment space as possible.

With the extent that the aim is to adjust in a total of four degrees of freedom, it is advantageous furthermore when the lever arrangement comprises two tilting levers that lie axially one behind another and can respectively be acted upon by an actuating member independently of one another. Thus, it is possible in this case for the offset x and the angle x or for the offset y and the angle y to be involved such that with reference to the actuation there is respectively an angle of 90° relative to the positioning members of the two other degrees of freedom. The two tilting levers can be pivoted about the same axis, in which case two mutually independent aligned pivoting axes can be involved in this case in physical terms, and these can be designed as integral constituents of the holding device, or as components inserted there.

There are various possibilities here for configuring and developing the teaching of the present invention in an advantageous way. Reference is to be made to this end, on the one hand, to the subordinate claims, and on the other hand to the following explanation of a preferred exemplary embodiment of the apparatus according to the invention with the aid of the drawing. In conjunction with the explanation of the preferred exemplary embodiment of the apparatus according to the invention with the aid of the drawing, there is also an explanation in general terms of a preferred refinement and developments of the teaching. In the drawing:

FIG. 1 shows a schematic cross section of an exemplary embodiment of an apparatus according to the invention for adjusting an optical fiber, FIG. 2 shows the apparatus from FIG. 1 in a perspective side view, FIG. 3 shows the subject matter from FIG. 2 in a perspective front view, the holding device being broken away in order to illustrate the lever arrangement, and FIG. 4 shows the subject matter from FIG. 3 in a perspective side view similar to the illustration from FIG. 2 but without the holding device.

FIGS. 1 to 4 show an exemplary embodiment of an apparatus according to the invention for adjusting an optical fiber 1, in which case a fiber bundle can also be involved here. The adjustment is performed relative to a coupling point or relative to a subassembly (that is not shown in the figures). Thus, in concrete terms it can be an apparatus for adjusting an optical fiber in order to couple a light beam into a microscope that is involved.

The apparatus comprises a holding device 2 that can be identified particularly well in FIGS. 1 and 2. The holding device 2 serves the purpose of accommodating the fiber 1 or of accommodating a component bearing the fiber 1. Also provided is a positioning mechanism 3 for positioning the fiber 1 in the holding device 2, with the positioning mechanism 3 comprising four positioning members 4 in the exemplary embodiment selected in the figures. The positioning members 4 act in pairs at an angle of 90° to one another, it being possible by acting on them to vary, and thus to adjust, the position of the fibers 1 relative to the holding device 2.

The positioning members 4 acting in pairs at an angle of 90° to one another are arranged next to one another in the holding device 2 for the purpose of being acted upon from one side, that is to say while avoiding the need to be acted upon from all sides. Two of the positioning members 4 act on the fiber 1 or the component containing the fiber 1 not directly, but via a lever arrangement 5.

It is indicated in FIG. 1 that the fiber 1 is held with its free end 6 in a receptacle, this being a sleeve 7 in concrete terms, here. The positioning mechanism 3 acts on the sleeve 7.

FIGS. 1 to 4 show jointly that the setting is performed in four degrees of freedom, specifically with reference to the offset in the x- and y-directions with reference to the angle in the x- and y-directions. Four mutually independent positioning members 4 are provided to this end, and this can be gathered particularly well from FIGS. 2 to 4.

FIG. 1 also further shows that the positioning members 4 act in pairs at different angles on the sleeve 7 and thus on the fiber 1. The angular offset is accomplished by the lever arrangement 5, although the positioning members 4 lie in a common plane, something which can be gathered particularly well from FIGS. 2 to 4.

In concrete terms, the positioning members 4 are fine thread adjusting screws that are screwed through the holding device 2 and, on the one hand, act directly on the sleeve 7 and, on the other hand, on the lever arrangement 5—doing so in pairs.

FIGS. 1 to 4 further show that the sleeve 7 is held in the holding device 2 with the aid of particular fastening means, specifically with the aid of a holding ring 8. In accordance with the illustration selected in FIG. 1, the sleeve 7 is acted upon in the holding ring 8 by spring force, specifically by a spring arrangement 9 that extends in the corner region through the holding device 2 and can have its clamping/pressure force varied from outside the holding device 2 in accordance with the illustration in FIG. 2. To this end, there is screwed onto a thread belt a nut 10 by means of which it is possible to vary the spring force, and thus the contact force with which the sleeve 7 inside the holding ring 8 is pressed against the positioning members 4 and against the lever arrangement 5. This produces a prestressed bearing of the sleeve 7 inside the holding device 2, as a result of which the sleeve 7 can be pressed—elastically or resiliently—against the positioning members 4 and against the lever arrangement 5. This ensures secure positioning of the sleeve 7.

FIG. 1 shows particularly clearly that the lever arrangement 5 comprises a tilting lever 11, there being provided in accordance with the illustrations in FIGS. 2 to 4 two tilting levers 11 that are arranged parallel to one another or one behind another and can pivot about a common axis 12. Each tilting lever 11 can be actuated by a positioning member 4, in which case to this end the tilting lever 11 has an engagement region 13 for engaging the actuating member or positioning member 4. Furthermore, the tilting lever 11 is equipped with an angled-away actuating region 14 that serves for pressing against the sleeve 7.

FIG. 1 shows particularly clearly that the positioning members 4 or the fine thread adjusting screws serving as positioning members 4 have actuating domes 15 at the free end such that mechanical wear is substantially reduced in the event of sliding friction.

With reference to FIGS. 2 to 4, it may further be remarked that the screws serving as positioning members 4 are provided with hexagon heads such that it is easily possible to adjust by means of hexagon keys.

It may further be remarked that in the case of the exemplary embodiment shown in the figures the positioning members or screws act partially directly and partially indirectly on the sleeve 7 and thus on the fiber 1. However, it is also likewise conceivable for the component surrounding the fiber, that is to say the sleeve in the case of the exemplary embodiment shown here, to have mechanical precautionary measures at its surface that are adapted to the contour of the free end of the positioning member 4 such that a better coupling to the variation in position of the sleeve 7 is implemented.

It may also be remarked that the holding device can comprise a further dummy with the aid of which the holding device can be fastened on any desired component, machine frame or the like such that a stationary arrangement of the holding device is possible to this extent.

In order to avoid repetitions, reference may be made with regard to further advantageous refinements of the apparatus according to the invention to the general part of the description and to the attached patent claims.

Finally, it may be pointed out expressly that the exemplary embodiment of the apparatus according to the invention that was described above serves merely for discussing the teaching claimed but does not restrict the latter to the exemplary embodiment.

The invention claimed is:

1. An apparatus for adjusting an optical fiber or an optical fiber bundle relative to a coupling point, comprising:
    a holding device for the fiber/fibers; and
    a positioning mechanism for positioning the fiber/fibers in the holding device, the positioning mechanism comprising at least two positioning members that act on the fiber/fibers at different angles and can, by being actuated, vary a position of the fiber/fibers relative to the holding device;
    wherein the positioning members acting at different angles are arranged next to one another in the holding device in order to be actuated from one side, and at least one of the positioning members acts on the fiber/fibers via a lever arrangement;
    wherein the lever arrangement comprises two tilting levers that lie axially one behind another and can respectively be acted upon by a positioning member independently of one another;
    wherein the tilting levers can be pivoted about the same axis.

2. An apparatus for adjusting an optical fiber or an optical fiber bundle relative to a coupling point, comprising:
    a holding device for the fiber/fibers; and
    a positioning mechanism for positioning the fiber/fibers in the holding device, the positioning mechanism comprising at least two positioning members that act on the fiber/fibers at different angles and can, by being actuated, vary a position of the fiber/fibers relative to the holding device;
    wherein the positioning members acting at different angles are arranged next to one another in the holding device in order to be actuated from one side, and at least one of the positioning members acts on the fiber/fibers via a lever arrangement;
    wherein the fiber or the fiber bundle is held with a free end in a receptacle on which the positioning mechanism acts;
    wherein the fiber/fibers and/or the receptacle is/are held in/by the holding device with aid of a fastening device;
    wherein the fastening device comprises at least one holding ring surrounding the fiber/fibers and/or the receptacle.

3. The apparatus as claimed in claim 2, wherein the receptacle is designed as a cylindrical sleeve.

4. The apparatus as claimed in claim 2, wherein four mutually independent positioning members are provided for setting in four degrees of freedom (offset x/y and angle x/y).

5. The apparatus as claimed in claim 4, wherein the positioning members act in pairs at different angles on the fiber/fibers and/or on the receptacle.

6. The apparatus as claimed in claim 2, wherein the positioning members acting at different angles lie substantially in a common plane.

7. The apparatus as claimed in claim 2, wherein all the positioning members lie substantially in a common plane.

8. The apparatus as claimed in claim 2, wherein the positioning members comprise screws that can be screwed by the holding device.

9. The apparatus as claimed in claim 8, wherein the screws are designed as fine thread adjusting screws.

10. The apparatus as claimed in claim 8, wherein the screws or positioning members are arranged substantially parallel to one another.

11. The apparatus as claimed in claim 2, wherein the holding device is designed as a housing accommodating the fiber/fibers and/or receptacle at least partially with play.

12. The apparatus as claimed in claim 2, wherein the holding device is designed as an angle piece surrounding the fiber/fibers and/or receptacle at least partially with play.

13. The apparatus as claimed in claim 2, wherein the lever arrangement comprises two tilting levers that lie axially one behind another and can respectively be acted upon by a positioning member independently of one another.

14. The apparatus as claimed in claim 2, wherein the positioning members and/or a tilting lever have terminal actuating domes.

15. The apparatus as claimed in claim 2, wherein the fiber/fibers and/or the receptacle is/are held resiliently.

16. The apparatus as claimed in claim 15, wherein, for the purpose of being held elastically, the fiber/fibers and/or the receptacle is/are pressed against the inner wall of a holding ring or against the positioning members and lever arrangement with the aid of an elastic device.

17. The apparatus as claimed in claim 16, wherein the elastic device is a spring.

18. The apparatus as claimed in claim 2, wherein the lever arrangement has a tilting lever between the fiber or between the fibers or between a receptacle and a holding device.

19. The apparatus as claimed in claim 18, wherein a tilting lever is pivotably assigned to the holding device and presses against the fiber/fibers and/or receptacle or sleeve by being acted upon by a positioning member at an angle defined by the tilting lever.

20. The apparatus as claimed in claim 19, wherein the tilting lever has an engagement region for engaging the positioning member, and an actuating region, angled away therefrom, for pressing against the fiber/fibers and/or receptacle.

21. The apparatus as claimed in claim 19, wherein the tilting lever defines an acting angle of 90° to a plane of the positioning members.

* * * * *